United States Patent [19]

Dean

[11] 4,218,015
[45] Aug. 19, 1980

[54] GARDEN ROLLER CAPABLE OF STORING AND DISPENSING LIQUIDS

[76] Inventor: Thomas Dean, "Lynwood", Hooten Rd., Willaston, Wirral, Cheshire, England

[21] Appl. No.: 930,893

[22] Filed: Aug. 4, 1978

[30] Foreign Application Priority Data

Aug. 12, 1977 [GB] United Kingdom ............... 33831/77
Nov. 19, 1977 [GB] United Kingdom ............ 148230/77

[51] Int. Cl.² .............................................. B05B 9/00
[52] U.S. Cl. .................................... 239/147; 222/609; 222/628; 280/5 B
[58] Field of Search ............................... 222/608–610, 222/626, 628, 394, 401, 192, 320, 324, 465, 475, 529, 530, 527, 74; 280/5 B; 152/DIG. 5; 239/146, 147, 159, 175, 141, 289

[56] References Cited

U.S. PATENT DOCUMENTS

| | | | |
|---|---|---|---|
| 426,664 | 4/1890 | Donahoo | 239/141 |
| 581,416 | 4/1897 | Dunn et al. | 239/147 |
| 1,095,710 | 5/1914 | Cranwell | 239/147 |
| 1,869,869 | 8/1932 | Smith | 222/475 |
| 3,002,695 | 10/1961 | Matthewson | 239/175 |
| 3,191,974 | 6/1965 | Mann et al. | 280/5 B |

Primary Examiner—H. Grant Skaggs
Attorney, Agent, or Firm—Anthony J. Casella; Michael A. Stallman

[57] ABSTRACT

A garden roller capable of storing and dispensing a large volume of liquid without immobilizing the roller, includes a hollow drum, preferably made of plastic and having a handle pivotally connected thereto for rolling the drum. A flexible conduit passes outwardly from the interior of the drum through a flow aperture in an end wall of the drum and a seal is provided to prevent escape of liquid through the aperture. Liquid can be dispensed through the conduit via a pump connected to the conduit outside the drum or by pressurizing the interior of the drum. The flexible conduit is weighted at its open end such that it remains adjacent the bottom of the drum enabling the entire contents therein to be dispensed.

7 Claims, 4 Drawing Figures

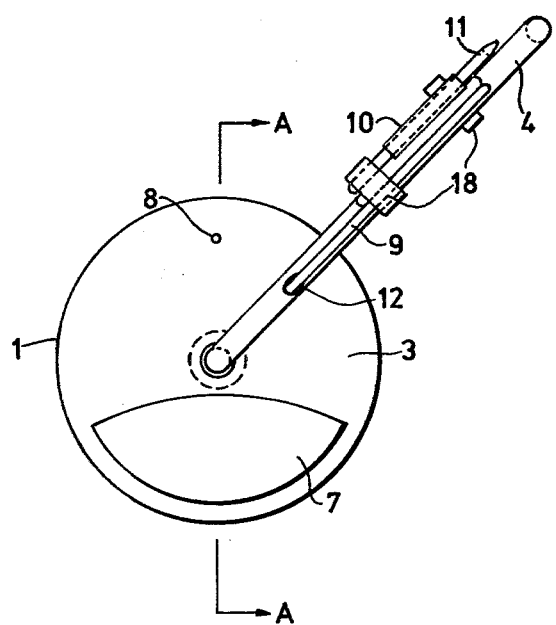
—FIG.1.—
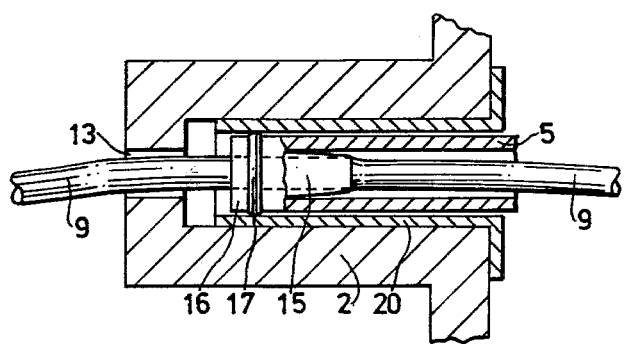
—FIG.3.—

GARDEN ROLLER CAPABLE OF STORING AND DISPENSING LIQUIDS

The present invention concerns a roller. In particular, the invention concerns a roller capable of moving and dispensing liquids.

British Patent Specification No. 1,473,508 discloses a mixing device comprising a drum of generally cylindrical form a handle pivotally connected to the drum whereby the drum can be rolled along a supporting surface, said drum being provided with an opening for filling and emptying and with internal vanes for agitating liquids and/or solids in the drum when it is rolled along the supporting surface.

The present invention seeks to provide a roller capable of containing a large volume of liquid and having means for dispensing the liquid as and where required and without immobilizing the roller. The roller can thereby perform a number of functions. It can operate as a conventional garden roller for levelling and flattening purposes, the necessary weight being provided by the liquid in the roller. In addition it can be used as a mobile store of liquid which can be dispensed as and where required. For example, the roller can be filled with a pesticide or the like and can then be rolled about a garden to plants and crops.

Therefore, according to the present invention a roller comprises a hollow substantially cylindrical drum, a handle pivotally connected to the drum for rolling the drum, a closable opening in the drum for the introduction of a liquid into the drum and a conduit passing outwardly from the interior of the drum along the axis of rotation of the drum and in sealing engagement with the drum for dispensing liquid from the drum. Conveniently, the conduit passes outwardly from the interior of the drum through the handle.

The invention will be described further, by way of example, with reference to the accompanying drawings; in which:

FIG. 1 is an end elevation of an embodiment of a roller having a liquid dispenser;

FIG. 3 is an enlarged section of the portion inscribed by the circle in FIG. 2.

Figure 2:
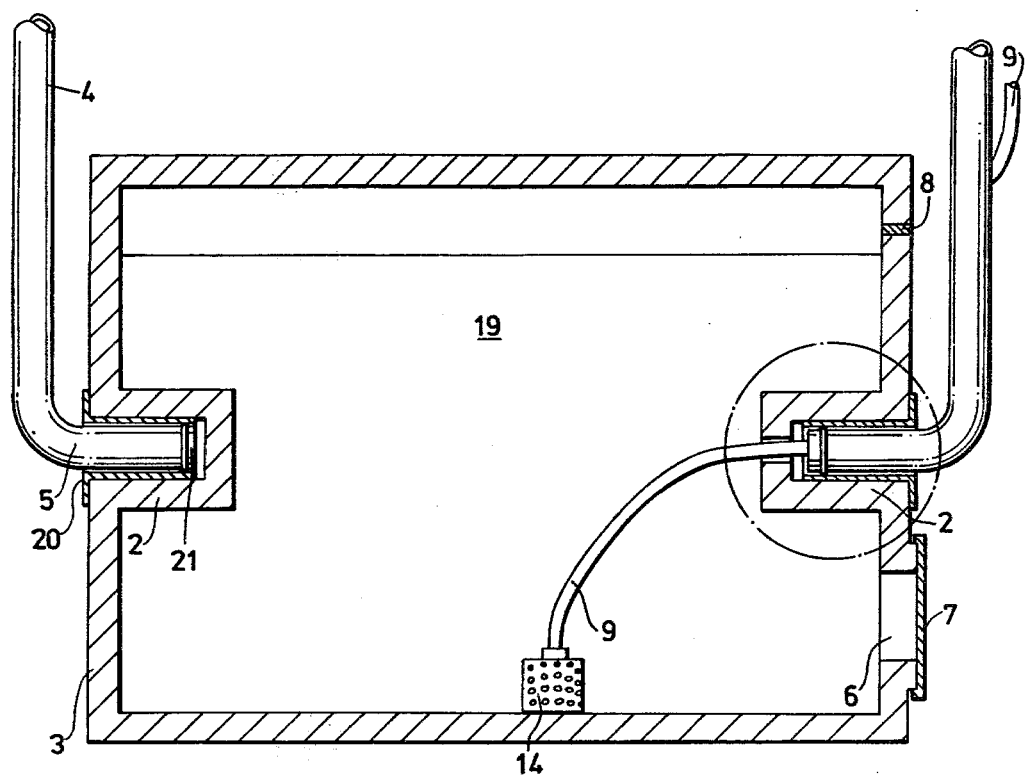
FIG. 2 is a section, not to scale, on the line A—A in FIG. 1.

A roller as illustrated comprises a hollow substantially cylindrical drum 1 conveniently formed from a plastic material, for example high density polyethylene. A central socket 2 is provided at each end 3 of the drum to receive the ends of a handle 4. The handle can be substantially U-shape and formed from metal tube. Conveniently the handle can be formed from a plurality of separate lengths which are releasably connected together into an integral assembly. The ends of the handle are turned inwardly towards each other to define coaxial stems 5 engageable in the sockets 2 whereby the handle is pivotally connected to the drum can be rolled by pulling or pushing on the handle. The handle can be sheathed in a plastic coating serving to protect the metal and also presenting an attractive finish to the handle.

An enlarged opening 6 is formed in one end 3 of the drum, the opening being closed by a removable or releasable cover 7. The cover 7 can be a plastic cap which fits in a snap-fit sealing engagement with a raised lip around the opening. The opening 6 and its cover 7 can be any shape and conveniently the opening is made as large as practical. A non-return valve 8, the purpose of which will be mentioned later, is arranged in one of the end walls of the drum.

A conduit 9, conveniently a plastics tube, passes into the interior of the drum by way of the handle. The end of the conduit 9 outside the drum can be connected to a pump 10, preferably a two-way hand pump, and the pump 10, in turn, can be connected to a detachable spray head 11. The conduit, which can be any desired length, enters the bore of the tubular handle 4 through an opening 12 in the handle. The conduit passes through the open end of one of the stems 5 and enters the drum 1 through an opening 13 in the end of the associated socket 2 in the end wall 3 of the drum. The diameter of the opening 13 is less than the outside diameter of the stem 5 whereby the end of the socket 2 can still function as a stop for axial positioning of the drum between the limbs of the handle. The length of the conduit 9 within the drum is such as to ensure that the end of the conduit reaches the cylindrical wall of the drum and preferably the end of the conduit is weighted to keep the end at the bottom of the drum. The weight can be provided by connecting the end of the conduit to a hollow metal cylinder having apertures in the wall thereof and serving as a sieve or coarse filter 14. Access to the end of the conduit for fixing the weight is obtained through the opening 6 in the end of the drum.

FIG. 3 shows the conduit passing through the stem 5 and the socket 2 into the interior of the drum.

At the end of the stem 5 the conduit is gripped by a tight fitting sleeve 15 having a slightly tapered leading end to assist the insertion of the sleeve into the stem. The sleeve 15 terminates in a flange 16 and carries an O-ring 17 having an outside diameter greater than that of the flange 16. The sleeve 15 is dimensioned to be a push fit in the end of the stem 5 and the O-ring is sandwiched between the end of the stem and the flange 16. The O-ring effects a seal to prevent escape of liquid from the drum and about the exterior of the stem and the sleeve 15 prevents leakage of liquid along the interior of the stem.

Preferably, a bushing 20 is inserted in each socket 2. Each bushing is a tight fit in its respective socket and can have an end flange abutting against the portion of the end wall 3 about the socket. The bushing 20, which can be nylon, protects the socket wall against wear and likewise and for a similar purpose an end cap 21 of a plastic material can be inserted in the end of the metal stem not associated with the conduit 9. The O-ring 17 is in sealing engagement with the bushing 20 while allowing the drum to rotate about the stem as an axis.

Detachable clips 18 or the like are provided for attaching the conduit 9 to the handle 4 when not required for use.

In operation, the drum is filled with liquid 19, such as a pesticide solution, through the opening 6 and the opening is closed by the cover 7 which provides a liquid-tight cap. The drum can then be rolled and the weight of the liquid in the drum enables the drum to function as a conventional roller used for levelling and flattening surfaces. To dispense the liquid, the conduit 9 is released from the handle 4 by removing or releasing the clips 18 and the pump 10 is operated to pump the liquid from the drum and through the spray head 11. A large quantity of liquid can be readily and easily moved about, for example, the drum can have a capacity in excess of 50 liters. Preferably the drum is translucent and can be formed with scale markings, for example ¼ full; ½ full; and full; to enable a user to assess at a glance the amount of liquid in the drum.

The one-way valve 8 functions to maintain atmospheric pressure within the drum as the liquid is dispensed from the drum. The valve 8 allows air to enter the drum as the liquid is drawn out thereby avoiding the creation of partial vacuum which could result in a distortion of the walls of the drum.

Figure 4:
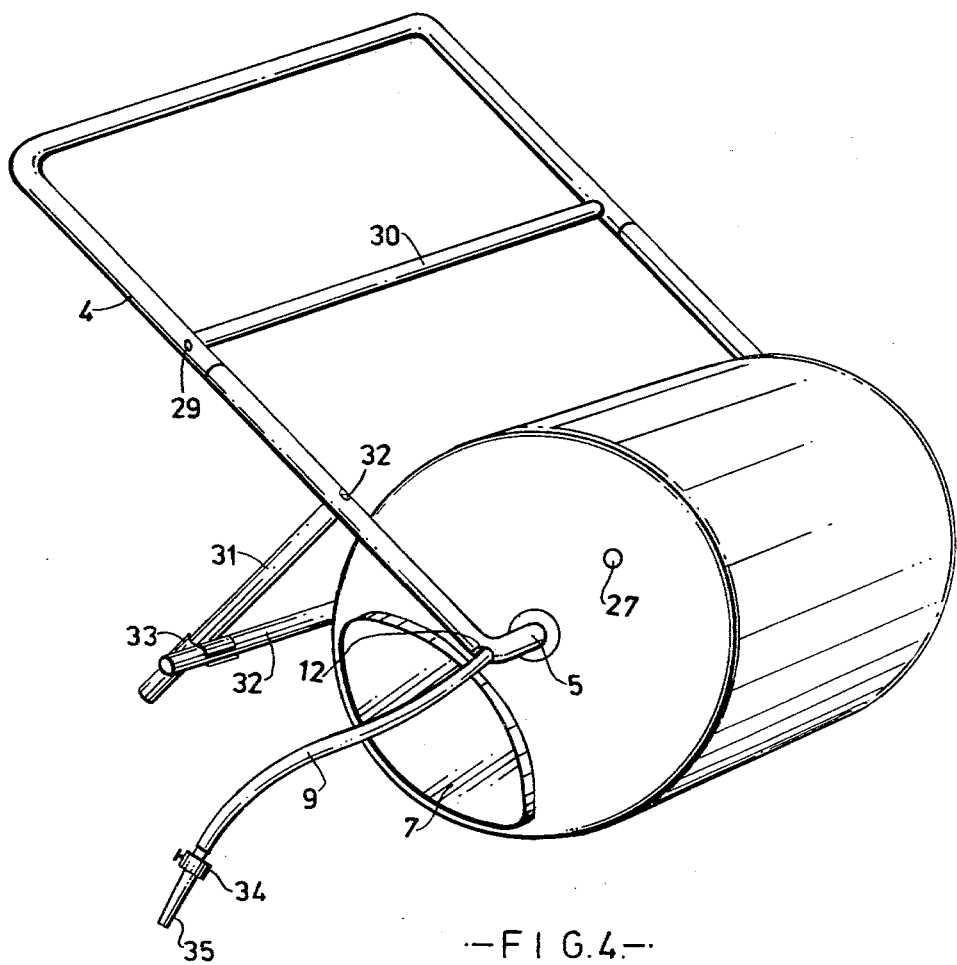
FIG. 4 is a perspective view of an alternative embodiment of the invention.

FIG. 4 shown an alternative embodiment and where appropriate the same reference numerals are used as in FIGS. 1 to 3.

In FIG. 4, a sprinkler attachment is mounted on the handle 4.

A leg 31 depends from the handle 4 and can be secured by a screw 36 passing through the handle and engaging a nut fixedly mounted within the end of the leg. The leg serves to support a sprinkler conduit 32 as well as acting as a ground engaging support for the handle 4. Thus, when released by a user, the handle will be supported at a predetermined height above the ground determined by the length of the leg 31.

The sprinkler conduit 32 is detachably secured to the leg 31 at any desired position by means of a clip 33. The clip 33, which can be a plastic, has a first portion to clip on to the leg 31 and a second portion to clip on to the conduit 32, the two portions being disposed substantially normal to each other. In this way the conduit 32, which is a rigid tube conveniently formed from a plastic material and having a plurality of spaced apart apertures along the length thereof, is releasably secured to and supported by the leg 31. The end of the conduit 32 adjacent the leg is open and the opposite end, the end in FIG. 4 which is obscured by the drum, is closed.

In this embodiment the conduit 9 in communication with the interior of the drum emerges through opening 12 which is positioned substantially on the axis of rotation of the drum. The end of the conduit outside the drum has a stop-cock or tap 34 having a spigot portion 35 for insertion in the open end of the sprinkler conduit 32. A one-way valve 27 is arranged in an end wall of the drum. The valve 27 is of the type such that a pump, for example a bicycle pump, can be connected thereto in order to pressurise the air-space within the drum. Alternatively, the drum can be provided with an integral pump built into the end wall of the drum.

In use, liquid is poured into the drum and the opening is then closed by the cover 7. The air-space above the liquid in the drum is pressurised by pumping through the valve 27. Upon inserting the spigot portion 35 into the end of the conduit and opening the stop-cock 34 liquid from the drum issues through the apertures in the conduit 32.

The position of the sprinkler conduit 32 can be reversed so as to extend outwardly beyond the end of the drum and in an opposite direction to that shown in the drawing. Such an arrangement can be useful when required to sprinkle borders and areas which are inaccessible to the drum.

The embodiment of FIG. 4 can also be provided with a sprayer as in FIG. 1. The free end of the conduit from the sprayer can be releasably fitted to the spigot 35 at the end of the conduit 9. It is then possible to use the roller either to spray, for example fruit trees using the spray gun or to sprinkle the ground using the sprinkler attachment.

In FIG. 4 the manner of effecting a seal for the conduit 9 in passing through the wall of the drum is the same as described with reference to FIGS. 1 to 3.

Conveniently, each lower limb portion of the handle can have an internal sleeve which projects to form a spigot to engage the corresponding end of the upper U-shaped portion of the handle. The sleeve extends into the stem 5 and the bending to form the stem 5 fixedly secures the sleeve in the limb. This avoids the welding of spigots into the ends of the limb portions. The upper and lower portions of the handle 4 are releasably secured together by screws 29 which extend through apertures in the handle portions and engage in threaded ends of a cross-piece 30.

While the invention has been described with reference to preferred embodiments it is not intended to limit the invention to the particular forms shown in the drawings. Clearly other arrangements are possible. For example a T-shaped handle can be provided having a forked or branched end to engage the ends of the drum. Instead of inwardly directed sockets the drum can have outwardly directed stub shafts to receive the ends of the handle and the handle can be arranged whereby it is not necessary for the conduit to pass through the handle in emerging from the drum. A valve can be included in the conduit 9, the valve serving to compensate for pressure change in the drum as liquid exits through the conduit to thereby maintain a substantially constant rate of flow. It is possible to omit the pump associated with the spray head and to rely on pressure within the drum to direct liquid to either the spray head or the sprinkler bar. As a safety feature the cover 7 can be designed to blow off in the event of over pressurising the drum. The drum can depart from a true cylindrical shape and still be rolled about.

It is intended to include all such alternatives, modifications and equivalents within the spirit of the invention as defined in the appended claims.

I claim:

1. A garden roller for leveling and flattening the surface of the ground which is capable of storing, conveying and dispensing a liquid comprising:

a hollow, longitudinally extending cylindrical drum having opposed end walls, with one of said end walls having a closable opening therein for introducing a liquid into the interior of said drum;

a hollow tubular handle, pivotally connected to the opposed end walls of said drum along the longitudinal axis of rotation thereof, with one of said end walls of said drum further including a flow aperture disposed along the longitudinal axis of said drum and adapted to receive one end of said hollow handle, said flow aperture being in communication with the interior of said hollow drum;

means for dispensing the liquid from the interior of said drum, said dispensing means including a flexible conduit having an inlet portion disposed within said hollow drum and an outlet portion disposed exterior of said drum, said inlet portion having an open end, said conduit passing from the interior of said drum to the exterior thereof through said flow aperture and with at least a part of said outlet portion of said conduit being disposed within said hollow handle; and sealing means for preventing the liquid inside said drum from passing through said flow aperture other than through said conduit, and with the length of said inlet portion of said conduit being at least as long as the length of the radius of said drum and with the open end of said inlet portion of said conduit being provided with a weight whereby when said handle is pivoted to facilitate the conveyance of said roller, the open end of said inlet portion of said flexible conduit remains substantially in a vertically downward position adjacent the bottom of the drum, thereby enabling the entire contents of the drum to be dispensed.

2. A roller according to claim 1 including a pump for connection to the conduit external of the drum.

3. A roller according to claim 1 including a sprinkler attachment mounted on the handle for connection to the conduit, with said conduit and said sprinkler attachment defining a liquid flow path, and means for pressurizing the interior of the drum whereby the liquid therein may be dispensed through the conduit to the sprinkler attachment.

4. A roller according to claim 3 including a selectively operable on/off valve in the liquid flow path to the sprinkler attachment.

5. A roller according to claim 3 in which the sprinkler attachment comprises a support leg for the handle and a sprinkler conduit detachably secured to the leg.

6. A garden roller as recited in claim 1 wherein said sealing means includes a tubular sleeve connected to said one end of said tubular handle and having a tapered leading end disposed within said handle with the opposed end of said tubular sleeve terminating in a flange; said sealing means further including a sealing ring disposed between said one end of said handle and said flange to prevent the escape of liquid.

7. A garden roller as recited in claim 6 wherein said sealing means further includes a protective bushing disposed between the exterior surface of said hollow handle and the interior surface of said flow aperture.

* * * * *